No. 642,711.  
J. PARKER.  
MILLING MACHINE.  
(Application filed Dec. 24, 1898.)  
(No Model.)  
Patented Feb. 6, 1900.  
5 Sheets—Sheet 4.

FIG. 4.

WITNESSES,  
J. H. Thurston.  
R. A. Bates.

INVENTOR,  
John Parker  
BY Wilmarth H. Thurston  
ATTY

UNITED STATES PATENT OFFICE.

JOHN PARKER, OF PROVIDENCE, RHODE ISLAND, ASSIGNOR TO THE BROWN & SHARPE MANUFACTURING COMPANY, OF SAME PLACE.

MILLING-MACHINE.

SPECIFICATION forming part of Letters Patent No. 642,711, dated February 6, 1900.

Application filed December 24, 1898. Serial No. 700,281. (No model.)

*To all whom it may concern:*

Be it known that I, JOHN PARKER, of the city and county of Providence, in the State of Rhode Island, have invented certain new and useful Improvements in Milling-Machines; and I do hereby declare the following specification, taken in connection with the accompanying drawings, forming a part of the same, to be a full, clear, and exact description thereof.

The invention relates to that class of machines known as "milling-machines," in which the work is supported on an adjustable and movable table and is acted upon by a rotary cutting or milling tool. In this class of machines the table is movably mounted upon a saddle which is laterally movable upon a knee, which is in turn mounted for vertical movement upon the frame of the machine.

In some milling-machines, known as "screw-feed" machines, the table is fed by means of a screw and nut, one of said parts being carried by the knee and the other by the table and one of said parts being rotated to feed the table. In other machines, known as "rack-feed" machines, the table is fed by a pinion engaging a rack on the table. In the screw-feed machines the table is fed more evenly and accurately than in the rack-feed machines, and, as usually constructed, the table is rigidly held in position by the action of the screw when the automatic feed is disengaged, so that the action of the cutter on the work will not feed the table forward and injure the cutter or work. On the other hand, the table of the screw-feed machines cannot be so quickly returned after a cut or so quickly moved in making large adjustments as can the table of rack-feed machines, and the rack-feed machines are preferred for some classes of work for this reason.

It is one of the objects of the present invention to provide a screw-feed machine in which the table may be quickly returned or given a large adjustment and in which the table will be held from movement when the automatic feed is thrown out, so that said machine will have the advantages of the present forms of rack-feed machines while retaining the advantages of the present forms of screw-feed machines.

A further object is to provide improved means for automatically feeding the table of a milling-machine which will act to hold the table against movement when the automatic feed is thrown out of action, and the features of novelty embodied in this means are not limited to screw-feed machines, but may be embodied in other classes of machines.

Further objects of the invention are to provide simple and efficient mechanisms for automatically feeding the saddle and the knee.

To these ends the invention consists in the features hereinafter described and claimed.

Referring to the drawings.

Referring to the drawings in detail, the knee 1 is mounted upon vertical ways 2 on the frame 3, which supports the cutter-spindle, (not shown,) and is adjusted or fed vertically by means of a screw 4, which is journaled in the knee and engages a stationary nut 5, carried by the frame. A bevel-gear 6 is secured to the upper end of the screw 4 and is engaged by a bevel-pinion 7, secured to a shaft 8, journaled in the knee and projecting beyond the front of said knee, where it is squared for the reception of a crank or hand-wheel. By turning the shaft 8 the knee may be manually adjusted to bring the work into proper relation to the cutter or may be moved to feed the work vertically by the cutter.

The saddle 9 is mounted upon ways 10, formed on the knee, and has a depending bracket 11 secured thereto. This bracket 11 is tapped at 12 to form a nut which is engaged by a screw-rod 13, journaled in the knee and having a squared end 14, projecting at the front of the knee. By turning the rod 13 the saddle may be manually adjusted or fed transversely on the knee.

Figure 1:
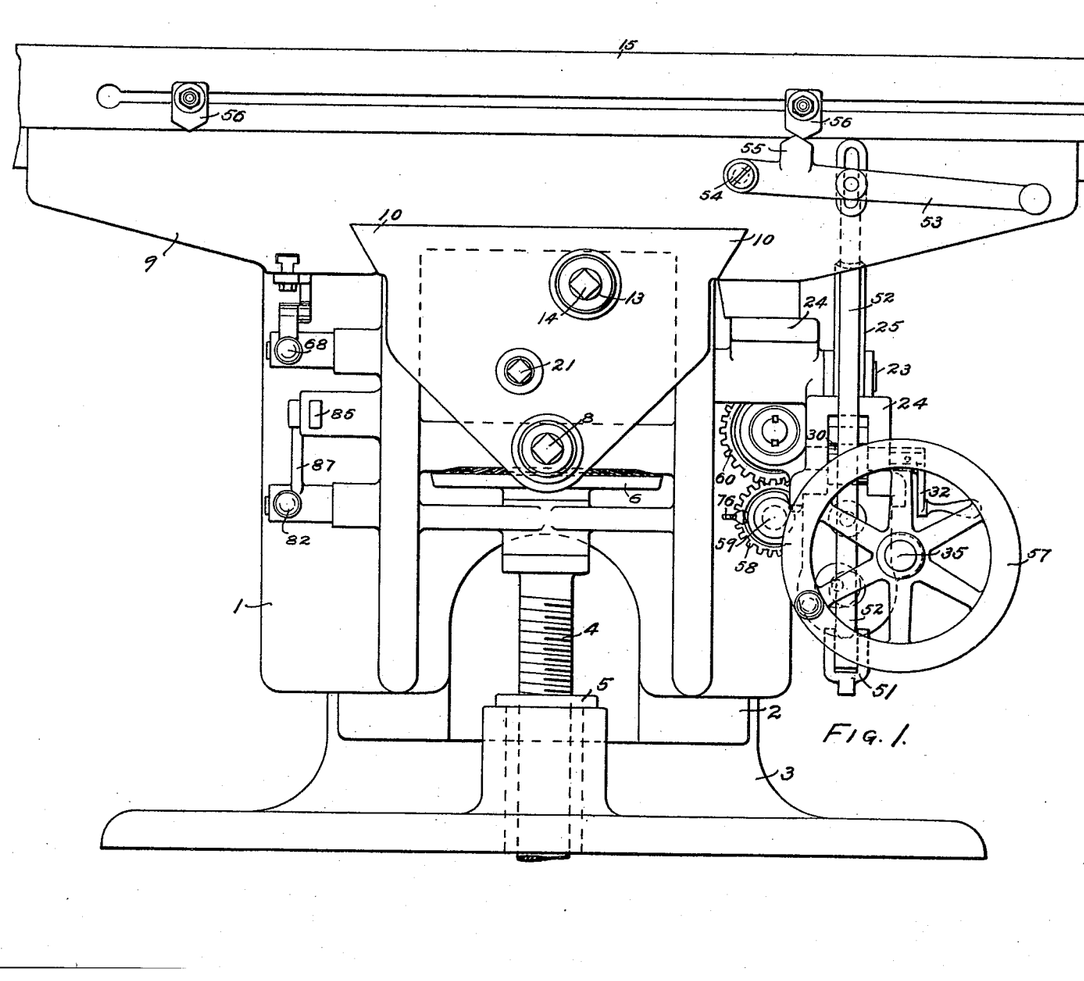
Figure 1 is a front elevation showing the knee of a milling-machine and the parts carried thereby which embody the present invention in its preferred form.
Figure 2:
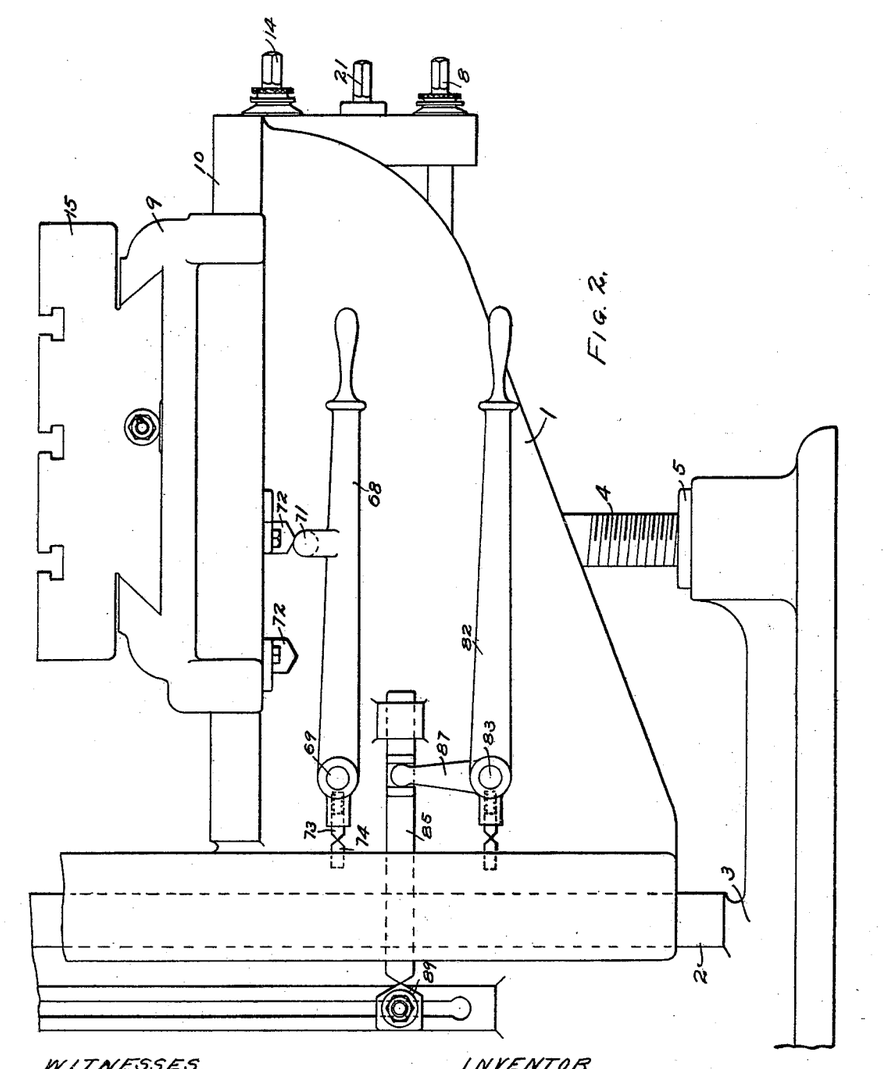
Fig. 2 is a side elevation of the same.
Figure 3:
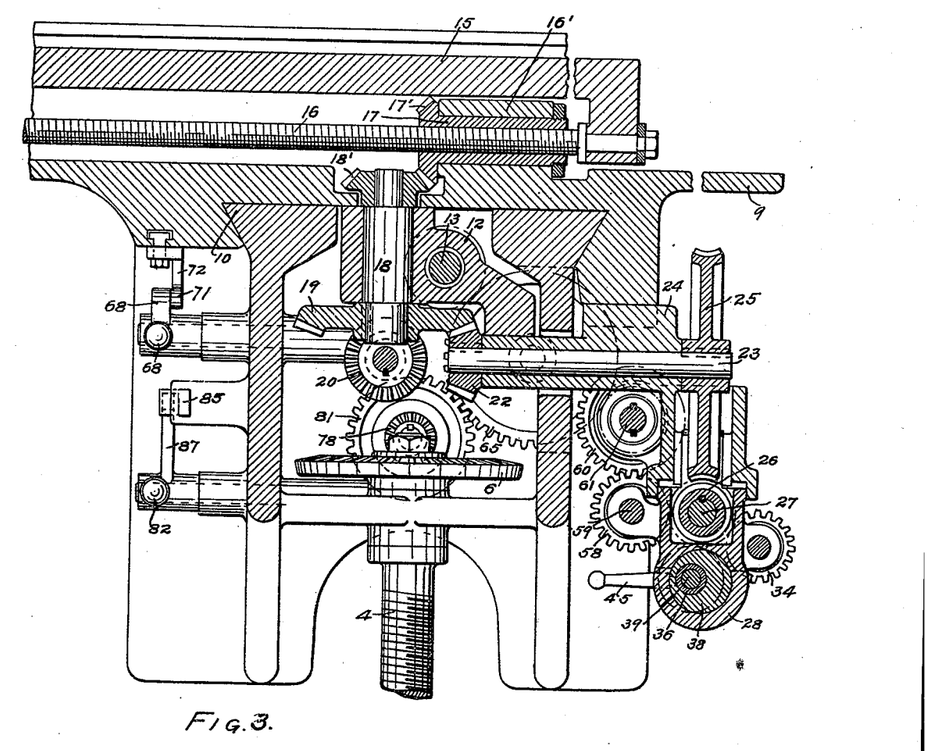
Fig. 3 is a sectional elevation taken longitudinally of the table.
Figure 4:
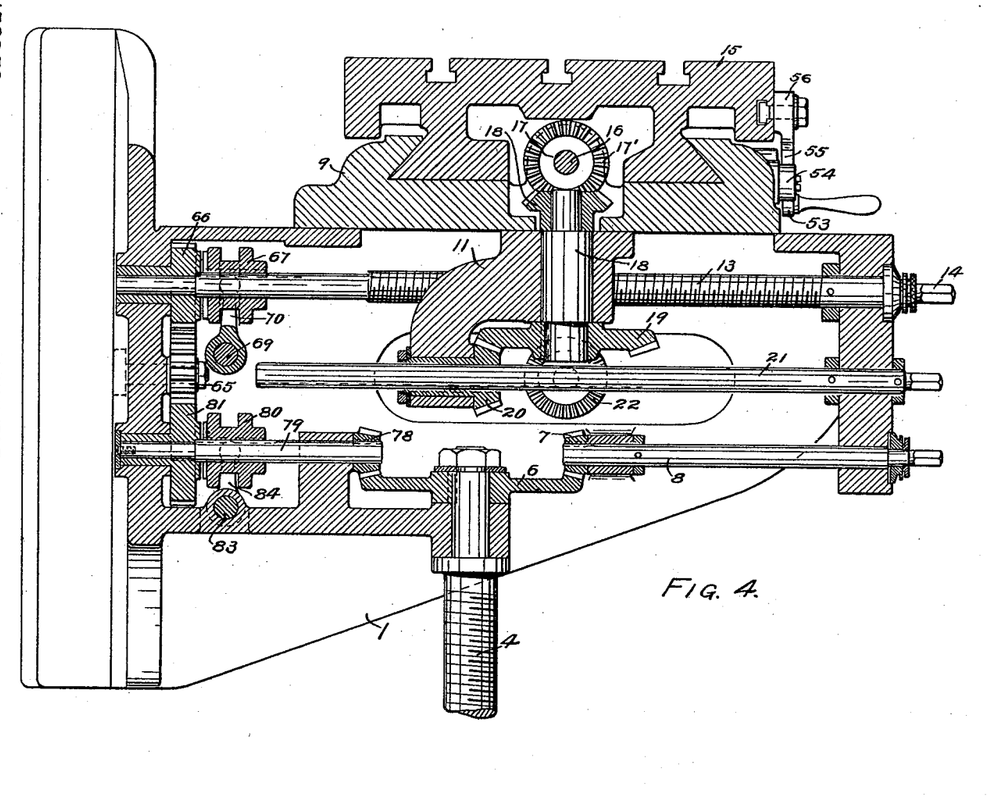
Fig. 4 is a sectional elevation taken transversely of the table.
Figure 5:
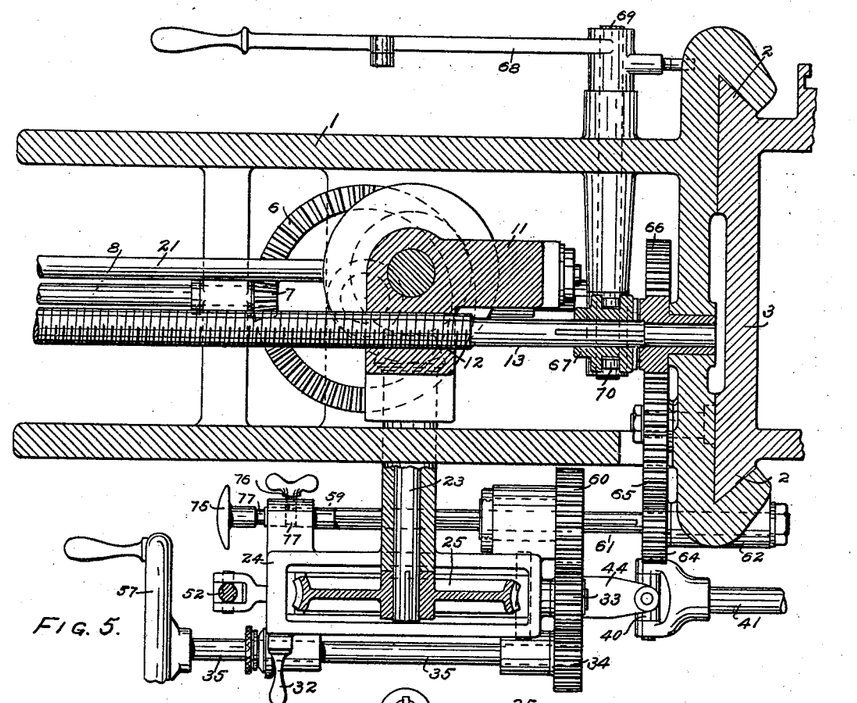
Fig. 5 is a horizontal sectional view through the knee below the saddle.

The table 15 is mounted for longitudinal movement on the saddle 9, and, as shown in Figs. 3 and 4, is provided with a screw-threaded rod 16, which is rigidly secured thereto. The screw-rod 16 passes through a nut 17, mounted in a bearing 16' on the saddle and forming the hub of a bevel-gear 17'. The gear 17' is engaged by a similar bevel-gear 18', secured to the end of a short vertical shaft 18, journaled in the bracket 11. A bevel-gear 19 is secured to the lower end of the shaft 18 and is engaged by a bevel-pinion 20, journaled in the bracket 11. A shaft 21 passes through the hub of pinion 20 and is connected therewith by a key and keyway, so that the pinion may slide on the shaft when the saddle is moved. The shaft 21 is journaled in the front of the knee and is provided with a squared end for the reception of a crank-handle, by which said shaft may be manually turned to quickly adjust or feed the table.

Figure 6:
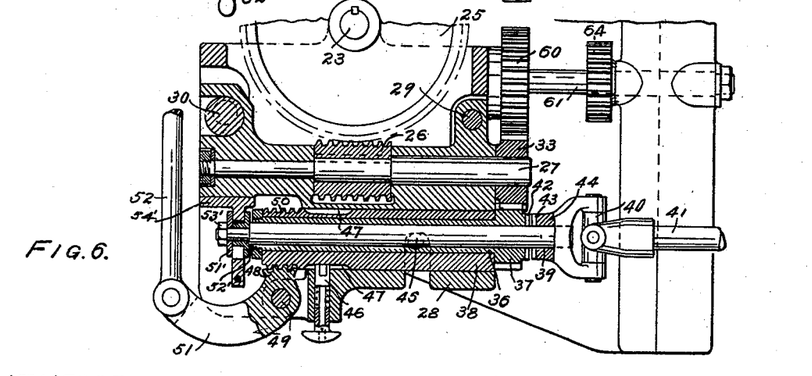
Fig. 6 is a sectional elevation of certain details of the feed mechanism.

The mechanism for effecting the automatic feeding of the table is as follows: The gear 19 is engaged by a pinion 22, secured to a shaft 23, which is mounted in a casting 24, secured to and forming part of the saddle 9. A worm-wheel 25 is secured to the outer end of the shaft 23 and is arranged to be engaged by worm 26, secured to a shaft 27, which is mounted in a vertically-movable block or carriage 28, pivoted at 29 to the casting 24. The block 28 is moved on its pivot and is rigidly held in adjusted position by an eccentric 30, journaled in the casting 24 and engaging a recess 31 in the block 28. A crank-handle 32 is secured to the journal of the eccentric for turning the same. When the eccentric 30 is turned into the position shown in Fig. 6, the block 28 is dropped to carry the worm 26 out of engagement with the worm-wheel 25, so that the table may be adjusted or fed manually, and when the eccentric is given a half-turn the block 28 is raised to bring the worm into engagement with worm-wheel 25, and said block is firmly held in place by the eccentric. A gear 33 is secured to the end of shaft 27 and is engaged by an idle gear 34, secured to a shaft 35, mounted in the block 28. A hollow shaft 36 is provided with a gear 37, which may be moved into engagement with either the gear 33 or the idle gear 34, the shaft 27 being driven in one direction when gear 37 is in mesh with gear 33 and in the opposite direction when gear 37 is in mesh with the idle gear 34. The means shown for throwing the gear 37 into mesh with gear 33 or gear 34 consists of a sleeve 38, in which the shaft 36 is eccentrically mounted and which forms the bearing for said shaft. A driving-shaft 39 is mounted within the hollow shaft 36 and is connected by means of a universal joint 40 and a rod 41 with the usual continuously-running shaft (not shown) mounted on the frame.

The end of shaft 36 is provided with clutch-teeth 42, arranged to engage clutch-teeth 43, formed on the hub 44, secured to the shaft 39, and said shaft 36 has a longitudinal movement to throw the clutch into and out of engagement. The sleeve 38 may be turned to throw the gear 37 into mesh with gear 33 or gear 34 by a handle 45, projecting from said sleeve, and said sleeve is held in either position by a spring-pin 46, provided with a V-shaped end which engages one of two V-shaped grooves 47 in said sleeve. When the clutch is in engagement, the shaft 36 is coupled to the driving-shaft 39 and is continuously driven and through the gearing described feeds the table in one direction or the other, depending on the gear with which gear 37 is in mesh. The sleeve 38 is held between the gear 37 and a nut on the end of shaft 36, so that any longitudinal movement of sleeve 38 will cause a corresponding movement of shaft 36. The shaft 36 is moved to disengage the clutch and stop the feed by means of a gear-segment 48, which is pivoted at 49 and engages a rack 50, formed by cutting annular grooves in sleeve 38. The segment 48 is formed on one arm of a lever, the other arm 51 of which is connected by a link 52 with a lever 53, pivoted at 54 to the saddle and provided with a lug 55, arranged to be engaged by dog 56, adjustably secured to the table. By lifting the lever 53 the sleeve 38 is moved to couple shafts 39 and 36 and throw the feed into action. This movement of lever 53 also brings the lug 55 into the path of the dog 56, and when said dog reaches said lug the lever 53 is depressed and the sleeve 38 and shaft 36 moved to stop the feed. When the sleeve 38 is moved to throw the feed into or out of operation, the shaft 39 is held from longitudinal movement by a bearing 51', which surrounds said shaft between a shoulder 52' on said shaft and a nut 53' on the end of said shaft. The bearing 51' is mounted in an opening formed in a bracket 54', secured to the bearing-block 28, and is held therein by flanges engaging the sides of said bracket. A hand-wheel 57 is secured to the shaft 35, and by turning said wheel the table may be given a fine and accurate feed or adjustment.

With the above construction a single screw-threaded shaft is carried by the table, so that the top of the table may be brought comparatively near to the top of the knee with a corresponding increase in the rigidity of the parts. The usual hand-wheel at the end of the table for manually operating the screw is dispensed with, and the manual feed for the table is located at the front of the knee, where it is convenient of access whatever the position of the table. The table may also be given a wider range of movement, as the ends of the table may pass inside the saddle, there being no handles at the end of the table to interfere with such movement. The screw 16 is preferably given a coarse lead, so that the table may be more rapidly moved through shaft 21 to quickly return or adjust the table, thus making the machine as convenient and as quickly operated in this respect as the rack-feed machines now in use. Should the lead of the screw be thus increased in screw-feed machines of former construction, the action of the cutter on the work when the automatic feed is tripped would act to feed forward the work and injure the work and cutter. With the present construction, however, the table is locked when the automatic feed is tripped by the action of the worm 26 and worm-wheel 25, which still remain in engagement when the automatic feed is tripped. The mounting of the worm in the manner shown provides a rigid support for the worm-shaft at all times, preventing any buckling of the shaft when turning in either direction, and the mounting of the mechanism for changing the direction of the feed upon the same bearing-block with the worm provides a simple and compact construction, which is conveniently adjusted and will not be liable to get out of order.

In order that the saddle may be fed in either direction automatically, means are provided for driving the screw 13 from the shaft 27, and in the construction shown this means is as follows: A gear 58 is secured to a shaft 59, mounted in the bearing-block 28, and is engaged and driven by the gear 33. The gear 58 also engages a gear 60, mounted in the casting 24, the arrangement being such that the axes of gears 58 and 60 are parallel when the block 28 is dropped to disengage the worm and worm-wheel. A shaft 61 is mounted in a bearing 62 on the knee and passes through the hub of gear 60, being connected therewith by a key and keyway, so that said shaft will be rotated with said gear, while allowing the gear to slide on said shaft as the saddle moves on the knee. A second gear 64 is secured to shaft 61 and engages an intermediate gear 65, mounted on the knee, which in turn meshes with a gear 66, loosely mounted on the screw-shaft 13. The gear 66 is connected and disconnected with the shaft 13 by a clutch 67, which is splined on the shaft and is arranged to engage clutch-teeth on the hub of gear 66. The clutch may be operated to throw the saddle-feed into or out of operation by a lever 68, secured to a shaft 69, mounted in the knee and having a yoke 70 secured thereto, the arms of which engage an annular groove in the clutch 67. The lever 68 is provided with a lug 71, which stands in the path of dogs 72 when the lever is in position to hold the clutch 67 in engagement. The dogs 72 are adjustably secured on the saddle and serve to automatically stop the feed of the saddle when they engage the lug 71.

When it is desired to feed the saddle automatically, the table-feed is thrown out by dropping the block 28, and the lever 68 is raised to engage the clutch 67. The screw-shaft 13 is now revolved in one direction or the other, depending on whether the gear 37 is in engagement with gear 33 or gear 34, and the saddle is moved on the knee until one of the dogs 72 rides over the lug 71, thus depressing lever 68 and throwing the clutch out of engagement. The end of lever 68 is provided with a spring-pressed pin 73, provided with a V-shaped end, which is arranged to engage opposite sides of a pointed pin 74, and thus hold the lever 68 in either of its positions. The shaft 59 may be mounted to slide in its bearings, so that the gear 58 may be moved out of mesh with gears 33 and 60, and thus disconnect the train of gearing between the shaft 27 and screw-shaft 13 when the cross or saddle feed is not in use. The end of shaft 59 may be provided with a knob 75 for moving said shaft longitudinally, and a screw 76 may be arranged to engage grooves 77 in shaft 59 to hold said shaft in its adjusted position.

In order to effect the automatic feed of the knee in either direction, means are provided for connecting the shaft 27 with the screw 4, and this means in the construction shown is as follows: The gear 6 is engaged by a pinion 78, secured to the end of a shaft 79, mounted in the knee and carrying a clutch 80, splined to slide thereon. The clutch is arranged to engage clutch-teeth on the hub of a gear 81, loosely surrounding the shaft 79. The gear 81 is driven from the shaft 37 through the gear 65, with which it engages. The clutch is operated to connect or disconnect the shaft 79 with the gear 81 by a lever 82, secured to a shaft 83, which carries a yoke 84, the arms of which engage an annular groove in the clutch. The clutch is operated automatically to stop the feed of the knee by means of a slide 85, which engages an arm 87, projecting from the hub of lever 82 and having its end arranged to engage a dog 89, adjustably secured on the frame. When the lever 82 is raised, the clutch is engaged and the feed of the knee takes place until the end of the slide 85 is forced back by engagement with the dog 89, when the clutch is disengaged and the feed stopped.

Figure 7:
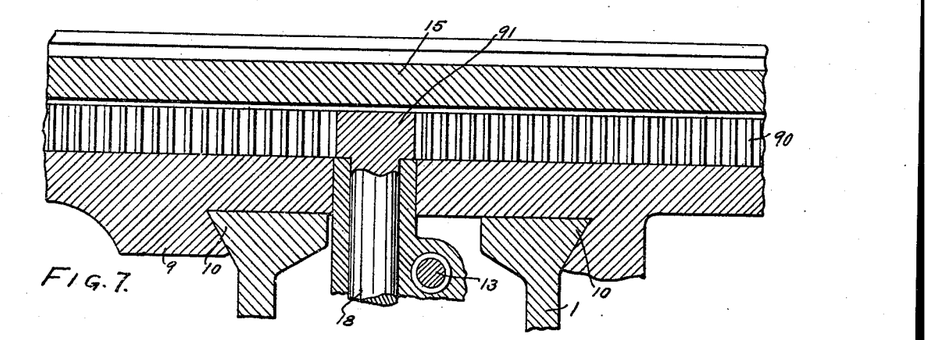
Fig. 7 is a longitudinal sectional view indicating the manner of applying the invention to rack-feed machines.

The mechanisms above described may be used in rack-feed machines as well as in screw-feed machines, and so far as certain features of invention are concerned it is immaterial what form of gearing is used to effect the movement of the table. In Fig. 7 a convenient form of rack-and-pinion gearing is shown for operating the table. In this construction the table is provided with a rack 90, which is engaged by a pinion 91, secured to or formed on the shaft 18, and when said shaft is turned motion is imparted to the table through said rack and pinion. In this class of machines the table is still locked in position by the worm 26 and worm-wheel 25 when the automatic feed is tripped, and a coarse and fine manual feed are provided, which are readily accessible at all times.

What I claim as my invention, and desire to secure by Letters Patent, is—

1. In a milling-machine, the combination with the table, of a feed therefor embodying a screw and nut of coarse lead, means for automatically throwing said feed out of operation, and means other than the screw and nut for preventing movement of the table when the feed is thrown out, substantially as described.

2. In a milling-machine, the combination with the table, of a feed therefor embodying a screw and nut of coarse lead, means for reversing the direction of the feed, means for automatically throwing said feed out of operation, and means other than the screw and nut for preventing movement of the table when the feed is thrown out, substantially as described.

3. In a milling-machine, the combination with the table, of a screw-threaded member of coarse lead thereon, a second screw-threaded member engaging the same, means for rotating one of said members, means for automatically throwing said rotating means out of operation, and means other than the screw-threaded members for preventing the movement of the table when said rotating means is thrown out, substantially as described.

4. In a milling-machine, the combination with the table, of a screw-threaded member thereon, a second screw-threaded member engaging the same, a worm-wheel connected to rotate one of said members, a worm engaging said worm-wheel, means for driving said worm, and means for automatically throwing said driving means out of operation, substantially as described.

5. In a milling-machine, the combination with the table, of a screw-threaded member carried thereby, a second screw-threaded member engaging the same, a worm-wheel connected to rotate one of said members, a worm engaging said worm-wheel, and means for driving said worm in either direction, substantially as described.

6. In a milling-machine, the combination with the table, of a screw-threaded member carried thereby, a second screw-threaded member engaging the same, a worm-wheel connected to rotate one of said members, a worm engaging said worm-wheel, means for driving said worm in either direction, and means for automatically throwing said driving means out of operation, substantially as described.

7. In a milling-machine, the combination with the table, of mechanism for feeding the same including a worm-wheel, a worm engaging the same, a gear connected with said worm, an intermediate gear engaging said gear, a gear arranged to engage either of said former gears, and means for driving said latter gear, substantially as described.

8. In a milling-machine, the combination with the table, of mechanism for feeding the same including a worm-wheel, a worm engaging the same, a movable bearing-block carrying said worm, and mechanism for driving said worm in either direction carried by said block, substantially as described.

9. In a milling-machine, the combination with the table, of mechanism for feeding the same including a worm-wheel, a worm engaging the same, a pivoted bearing-block carrying said worm, mechanism for driving said worm in either direction carried by said block, and an eccentric for operating said bearing-block, substantially as described.

10. In a milling-machine, the combination with the table, of mechanism for feeding the same including a worm-wheel, a worm engaging the same, a gear connected with said worm, an intermediate gear engaging said gear, a gear arranged to engage either of said gears, a rotary sleeve in which said gear is eccentrically mounted, and means for rotating said gear, substantially as described.

11. In a milling-machine, the combination with the table, of mechanism for automatically feeding said table comprising a shaft, gearing between said shaft and table, a gear on said shaft, an intermediate gear meshing therewith, a rotary shaft carrying a gear arranged to mesh with either of said former gears, and a rotary sleeve in which said rotary shaft is eccentrically mounted, substantially as described.

12. In a milling-machine, the combination with the table, of mechanism for feeding the same including, a shaft, a gear secured thereto, an intermediate gear engaging said gear, a gear arranged to engage either of said gears, a rotary sleeve in which said gear is eccentrically mounted, a clutch for driving said gear, and means for shifting said sleeve longitudinally to engage and disengage said clutch, substantially as described.

13. In a milling-machine, the combination with the table, of a driving-shaft, a hollow shaft surrounding the same and carrying a gear, a sleeve in which said hollow shaft is eccentrically mounted, a clutch for connecting said driving-shaft and hollow shaft, means for shifting said sleeve and hollow shaft longitudinally to operate said clutch, and gears connected to feed the table in opposite directions arranged to be engaged by the gear on the hollow shaft, substantially as described.

14. In a milling-machine, the combination with the table, of a driving-shaft, a hollow shaft surrounding the same and carrying a gear, a sleeve in which said hollow shaft is eccentrically mounted, a clutch for connecting said driving-shaft and hollow shaft, an annular rack on said sleeve, a segment engaging said rack, means carried by the table for operating said segment, and gears connected to feed said table in opposite directions and arranged to be engaged by the gear on the hollow shaft, substantially as described.

15. In a milling-machine, the combination with the table, of a vertical shaft connected to feed the table, a bevel-gear secured to said shaft, a horizontal shaft carrying a bevel-gear engaging said former gear, a worm-wheel on said shaft, a worm engaging said worm-wheel, and mechanism for driving said worm, substantially as described.

16. In a milling-machine, the combination with the table, of a vertical shaft connected to feed the table, a bevel-gear secured to said shaft, a horizontal shaft carrying a bevel-gear engaging said former gear, a worm-wheel on said shaft, a worm engaging said worm-wheel, and mechanism for driving said worm in either direction, substantially as described.

17. In a milling-machine, the combination with the table, of a vertical shaft connected to feed the same, a bevel-gear secured to said shaft, a horizontal shaft carrying a bevel-gear engaging said former gear, a worm-wheel on said shaft, a worm engaging said worm-wheel, a bearing-block carrying said worm, means for moving said bearing-block to engage and disengage the worm and worm-wheel, and mechanism carried by said block for driving said worm in either direction, substantially as described.

18. In a milling-machine, the combination with the table, of a vertical shaft connected to feed the same, a bevel-gear secured to said shaft, a shaft provided with a bevel-gear engaging said former gear, a worm-wheel secured to said shaft, a worm engaging said worm-wheel, means for disengaging said worm and worm-wheel, and a manually-operated shaft geared to said vertical shaft, substantially as described.

19. In a milling-machine, the combination with the table, of a screw-threaded member carried thereby, an engaging screw-threaded member, a vertical shaft connected to rotate one of said members, a bevel-gear secured to said shaft, a shaft having a bevel-gear engaging said gear, a worm-wheel secured to said shaft, means for disengaging said worm and worm-wheel, and a manually-operated shaft geared to said vertical shaft, substantially as described.

20. In a milling-machine, the combination with the table, of a shaft 18 connected to feed the same, gear 19 secured thereto, gear 20, shaft 21, gear 22, shaft 23, worm-wheel 25, worm 26, bearing-block 28 carrying said worm, and driving mechanism for said worm, substantially as described.

21. In a milling-machine, the combination with the table, of shaft 23 connected to feed the same, worm-wheel 25 secured thereto, worm 26, shaft 27, bearing-block 28, gears 23 and 24 carried thereby, shaft 36, having gear 37 secured thereto, sleeve 38 in which shaft 36 is eccentrically mounted, shaft 39, clutch-teeth on shaft 36 and shaft 39, and means for moving sleeve 38 longitudinally, substantially as described.

22. In a milling-machine, the combination with the table, of a screw-rod 16 carried thereby, a rotary nut 17, a gear 17' secured thereto, a gear 18', a shaft 18, a gear 19 secured thereto, a gear 22 engaging gear 19, shaft 23, worm-wheel 25, worm 26, and means for driving said worm, substantially as described.

23. In a milling-machine, the combination with the table, of a screw-rod 16 carried thereby, a rotary nut 17, carrying gear 17', a gear 18', engaging gear 17', shaft 18, gear 19, gear 22, shaft 23, worm-wheel 25, worm 26, means for driving said worm, and means for automatically throwing said driving means out of operation, substantially as described.

24. In a milling-machine, the combination with the table, of mechanism for feeding the same including a worm-wheel, a worm engaging said worm-wheel, a gear connected with said worm, an intermediate gear engaging said gear, a driving-gear, means for shifting said driving-gear to engage either of said gears, and means for manually operating said intermediate gear, substantially as described.

25. In a milling-machine, the combination with the table, of a screw-threaded member carried thereby, a second screw-threaded member engaging the same, mechanism for rotating one of said members to feed the table including a worm-wheel, a worm, means for automatically driving said worm, and means for manually operating said worm, substantially as described.

26. In a milling-machine, the combination with the table and the saddle on which said table is mounted, of a screw for operating said saddle, a driving-shaft, gearing between said shaft, and screw, and a clutch for connecting said screw with said gearing, substantially as described.

27. In a milling-machine, the combination with the table and the saddle on which said table is mounted, of a screw for operating said saddle, a driving-shaft provided with a gear, two gears connected to drive said screw in opposite directions, and means for shifting said driving-shaft gear into engagement with either of said gears, substantially as described.

28. In a milling-machine, the combination with the table and the saddle on which said table is mounted, of a screw for operating said saddle, a gear loosely mounted on said screw, a clutch for connecting said gear to said screw, a driving-shaft, gearing connecting said driving-shaft and loose gear, and means for automatically disengaging said clutch, substantially as described.

29. In a milling-machine, the combination with the table and the saddle on which said table is mounted, of a screw for operating said saddle, a gear loosely mounted thereon, a clutch for coupling said gear and shaft, a driving-shaft, a gear thereon, two gears connected with said loose gear to rotate the same in opposite directions, means for shifting said driving-shaft gear into engagement with either of said gears, and means for automatically disengaging said clutch, substantially as described.

30. In a milling-machine, the combination with the table and the saddle on which said table is mounted, of a screw for operating said saddle, gearing for rotating said screw, a clutch for coupling said gearing to said screw, and means operated by the movement of the saddle for disengaging said clutch, substantially as described.

31. In a milling-machine, the combination with the saddle, of a screw for operating the same, a gear loosely mounted thereon, a gear connected with said loose gear, an intermediate gear, a driving-shaft carrying a gear arranged to engage either of said latter gears, a sleeve in which said driving-shaft is eccentrically mounted, and a clutch for coupling said screw to said loose gear, substantially as described.

32. In a milling-machine, the combination with a saddle, of a table mounted thereon, mechanism for feeding the table embodying a rotary shaft, means for reversing the direction of rotation of said shaft, mechanism geared to said shaft for operating the saddle, a clutch for throwing said mechanism into and out of operation, and means for disengaging said clutch by the movement of the saddle, substantially as described.

33. In a milling-machine, the combination with the table, saddle, and knee, of a screw for operating the knee, a driving-shaft, gearing between said shaft and screw embodying a clutch, and means for disengaging said clutch to stop the feed of the knee, substantially as described.

34. In a milling-machine, the combination with the table, saddle, and knee, of a screw for operating said knee, a driving-shaft provided with a gear, two gears connected to drive said screw in opposite directions, and means for shifting said driving-shaft gear into engagement with either of said gears, substantially as described.

35. In a milling-machine, the combination with the table, saddle, and knee, of a screw for operating said knee, a shaft for operating said screw, a gear loosely mounted thereon, a clutch for coupling said gear to said shaft, a driving-shaft, gearing connecting said driving-shaft and loose gear, and means for automatically disengaging said clutch, substantially as described.

36. In a milling-machine, the combination with the table, saddle, and knee, of a screw for operating said knee, a shaft geared thereto, a gear loosely mounted on said shaft, a clutch for coupling said gear to said shaft, a driving-shaft, a gear thereon, two gears connected with said loose gear to drive the same in opposite directions, means for shifting said driving-shaft gear into engagement with either of said gears, and means for automatically disengaging said clutch, substantially as described.

37. In a milling-machine, the combination with the table, saddle, and knee, of a screw for operating said knee, gearing for rotating said screw, embodying a clutch, and means operated by the movement of the knee for disengaging said clutch, substantially as described.

38. In a milling-machine, the combination with the knee, of a screw for operating the same, a shaft geared to said screw, a gear loosely mounted thereon, a gear connected with said loose gear, an intermediate gear, a driving-shaft carrying a gear arranged to engage either of said latter gears, a sleeve in which said driving-shaft is eccentrically mounted, and a clutch for coupling said loose gear to its shaft, substantially as described.

39. In a milling-machine, the combination with the table and the saddle on which said table is mounted, of a screw for operating said saddle, a gear loosely mounted thereon, mechanism for automatically driving said gear, a clutch for coupling said gear to said screw, a rock-shaft for operating said clutch, a lever connected therewith, and an adjustable dog on the saddle for operating said lever, substantially as described.

40. In a milling-machine, the combination with the knee, of a screw for operating the same, a shaft geared to said screw, a gear loosely mounted on said shaft, mechanism for automatically driving said gear, a clutch for coupling said gear to said shaft, a rock-shaft for operating said clutch, a lever connected therewith, and an adjustable dog on the frame for operating said lever, substantially as described.

JOHN PARKER.

Witnesses:
JAMES H. THURSTON,
R. A. BATES.